United States Patent

[11] 3,613,533

| [72] | Inventor | Kiyoshi Kitai<br>Tokyo, Japan |
|---|---|---|
| [21] | Appl. No. | 801,988 |
| [22] | Filed | Feb. 25, 1969 |
| [45] | Patented | Oct. 19, 1971 |
| [73] | Assignee | Kabushiki Kaisha Hattori Tokeiten<br>Tokyo, Japan |
| [32] | Priority | Feb. 28, 1968 |
| [33] | | Japan |
| [31] | | 43/12430 |

[54] AUTOMATIC FLASHING DEVICE
11 Claims, 2 Drawing Figs.
[52] U.S. Cl. .................................................. 95/10 C,
95/11.5 R, 95/53 E
[51] Int. Cl. ...................................................... G01j 1/00
[50] Field of Search ........................................... 95/11, 11.5,
10 C, 53 E

[56] References Cited
UNITED STATES PATENTS

| 3,259,043 | 7/1966 | Pagel | 95/11 X |
| 3,374,718 | 3/1968 | Hochreiter | 95/10 C |
| 3,393,620 | 7/1968 | Reiche et al. | 95/11 |
| 3,418,904 | 12/1968 | Wick et al. | 95/10 |
| 3,426,661 | 2/1969 | Wick et al. | 95/10 C |

*Primary Examiner*—Samuel S. Matthews
*Assistant Examiner*—Robert P. Greiner
*Attorneys*—Robert E. Burns and Emmanuel J. Lobato ABSTRACT: A camera is equipped with apparatus including an electric circuit for sensing the brightness of a subject to be photographed and means for automatically taking a daylight exposure if the brightness is above a predetermined level and a flash exposure if the brightness is below a predetermined level. Also included are lights that indicate to the operator that certain portions of the electric circuit are in their operative state.

PATENTED OCT 19 1971 3,613,533

AUTOMATIC FLASHING DEVICE

The present invention relates to improvements in photographic exposure control apparatus for cameras.

In known cameras employing an electric delay circuit, changeover between daylight and flash photography is effected by switching over from a photoelectric element to a fixed resistor in the circuit. When an operator wishes to make a photographic exposure, he determines whether or not the brightness of the object to be photographed is adequate for daylight exposure. If the brightness is adequate, the electric delay circuit incorporating the photoelectric element is operative to control the exposure time and when the brightness is determined to be insufficient, the electric delay circuit is switched over to incorporate the fixed resistor instead of the photoelectric element whereby the camera is ready for flash photography.

This procedure is somewhat complex in that it delays operation of the camera and at the same time causes vibration even when the exposure control mechanism and the circuits involved are automatically operated. It is of course necessary to carry out the exposure control after detecting whether or not the brightness of the object is sufficient and this in turn necessitates switching of the circuits. The present invention seeks to provide a control system for automatically effecting changeover between natural daylight and flash photography and which is less prone to vibration and has a substantially smoother and more uniform operation than control systems presently available.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings.

FIG. 1 is a diagrammatic illustration of a portion of the apparatus of the present invention; and FIG. 2 is a schematic representation of the electrical circuit for the present invention.

DESCRIPTION OF THE PREFERRED EMBODIMENT

Figure 1:
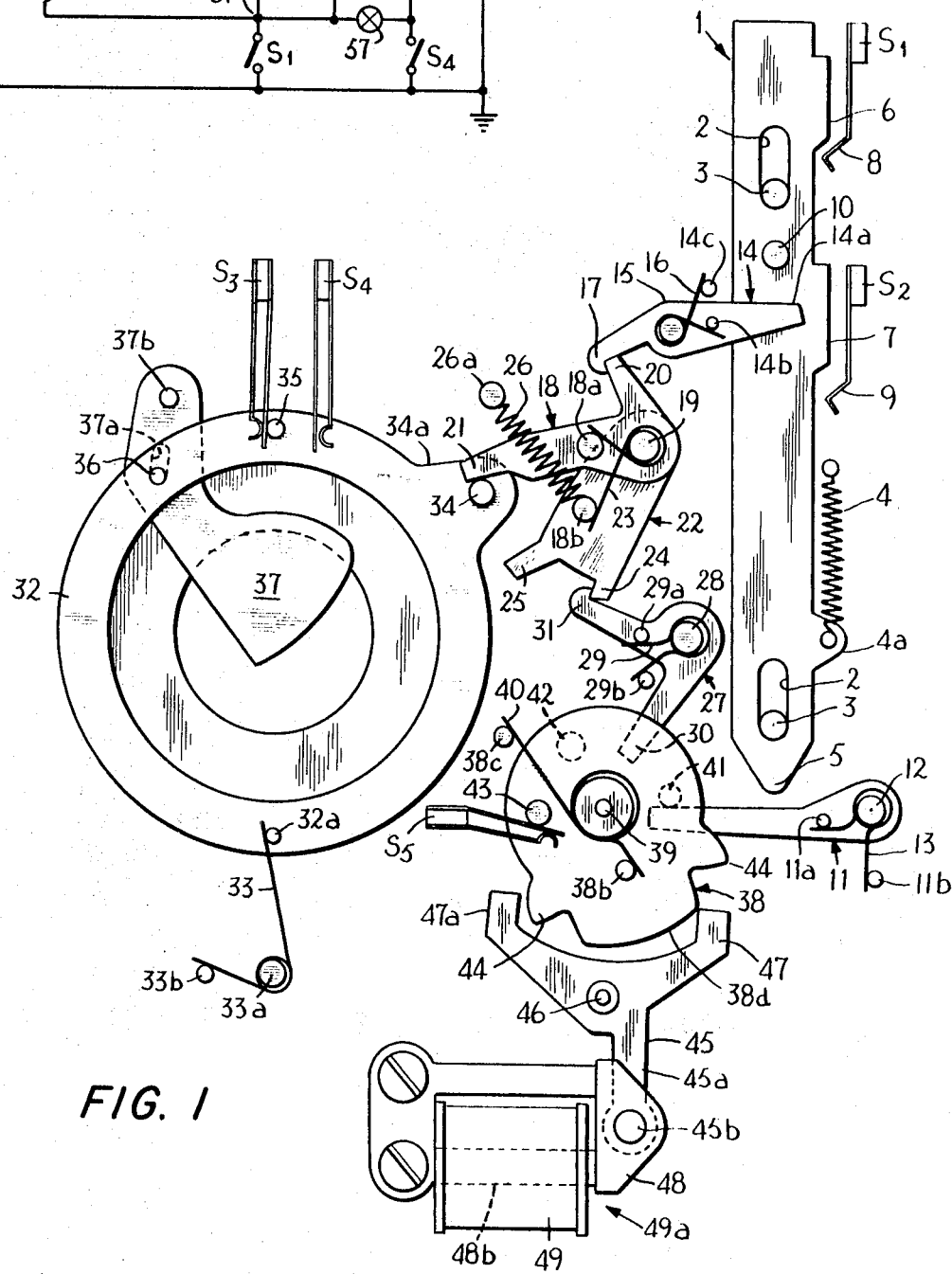

Turning now to the drawings, there is shown in FIG. 1 an elongated manually operable trigger lever 1 mounted for endwise movement, vertically, as shown in FIG. 1, the lever 1 having formed therein at either end section elongated guide slots 2 which receive a respective one of two fixed guide pins 3. The guide pins 3 and slots 2 cooperate to limit the endwise movement of the lever 1 to a predetermined distance. The lever 1 has protruding from the right side (FIG. 1) a plurality of protrusions including a tab 4a to which is secured one end of a coil spring 4 the other end of which is secured to a fixed pin thereby to bias the lever 1 in an upward direction (FIG. 1), and a pair of switch contacting surfaces 6 and 7 which are aligned with the contact arms 8 and 9, respectively, of the first and second switches S1 and S2, respectively, Thus, as the lever 1 is depressed, the contacting surfaces 6 and 7 are brought into engagement with the respective contact arms 8 and 9 (FIG. 1). The end of the trigger lever 1 is formed with a lever-contacting end 5 which is aligned with an elongated locking lever 11 that is pivoted by one end on a shaft 12 about which is wrapped a spring 13 one end of which is brought into engagement with a pin 11a on the lever 11 and the other end of which is brought into engagement with a fixed pin 11b, the springs 13 being arranged to bias the lever 11 in a clockwise direction (FIG. 1). Additionally formed on the trigger lever 1 on one face thereof and intermediate its ends is a lever-actuating pin 10 that is aligned with the pin-contacting arm 14a of an elongated hook lever 14 that is pivotally mounted intermediate its ends on a shaft 15. Wrapped about the shaft 15 is a spring 16 one end of which is in engagement with a pin 14b mounted on the arm 14a and the other end of which is engaged by a fixed pin 14c, the spring 16 being arranged to bias the hook lever 14 in a counterclockwise direction. The other arm of the hook lever 14 includes at its free end a hook 17 which is normally engaged by the free end section of the locking arm 20 of a substantially V-shaped opening lever 18. The V-shaped opening lever 18 is pivotally mounted at substantially the juncture of the arms of the V-shaped opening lever on a shaft 19 about which is wrapped a spring 23 one end of which is brought into engagement with a pin 18a the other end of which contacts a pin 18b which is mounted on one face of an elongated closing lever 22.

The free end of the other arm 21 of the V-shaped opening lever 18 is aligned with and in the path of a pin 34 mounted on a tab 34a integrally formed with and extending radially of a ring 32. The closing lever 22 is pivotally mounted by one end on the shaft 19 and is formed at its other end by a pair of spaced fingers, i.e., a pin-contacting finger 25 and a locking finger 24. Secured by one end to the pin 18b of the lever 22 is a coil spring 26 the other end of which is secured to a fixed pin 26a. The spring 26 being arranged to bias the closing lever 22 in a clockwise (FIG. 1) direction. It is noted that the spring 23 is arranged to bias the levers 22 and 18 so that the finger 25 of the lever 22 and the arm 21 of the lever 18 tend to move toward each other in a scissorlike action.

The locking finger 24 of the lever 22 is normally engaged as shown in FIG. 1 by a hook 31 formed at the free end of one of the two arms of a substantially V-shaped hook lever 27 the other arm of which is a pin-contacting arm 30. The V-shaped hook lever 27 is pivotally mounted at the juncture of the lever arm on a shaft 28 about which is wrapped a spring 29 one end of which engages a pin 29a mounted on the arm of the lever 27 that carries the hook 31, the other end of the spring 29 being engaged by a fixed pin 29b. The spring 29 is arranged so that the lever 27 is biased in a clockwise direction around the shaft 28. The ring 32 has formed thereon around the periphery thereof a plurality of pins, one of which, 32a, is engaged by one end section of a spring 33 that is wrapped around a fixed pin 33a the other end of which is engaged by a fixed pin 33b, thereby to bias the ring 32 in a counterclockwise direction (FIG. 1). Another one of the plurality of pins, pin 35, is arranged on the ring in the path of and between the pin-contacting ends of a timing switch S3 and a synchronizing switch S4. The last of the plurality of pins, 36, is received by an elongated slot 37a that is formed intermediate the ends of a sector blade 37 of a conventional shutter, the blade being pivoted by one end on a pin 37b. The rotation of the ring 32 moves the pin 36 along the slot 37a to open or close the sector blade 37 relatively to the exposure aperture, depending upon which way the ring 32 is rotated.

Referring still to FIG. 1, directly beneath the hook lever 27 there is pivotally on a shaft 39 a substantially disc-shaped cam plate 38 on which is mounted a pin 38b that is engaged by one end section of a spring 40 that is wrapped around the shaft 39, the other end section of the spring 40 being engaged by a fixed pin 38c, thereby to bias the plate 38 in a clockwise direction (FIG. 1). There is also formed on the same face of the cam plate 38 as the pin 38b a switch-contacting pin 43 that is aligned with the contacting end of a normally closed switch S5.

On the opposite face of the cam plate 38 there are formed a pair of spaced lever-contacting pins 41 and 42. Extending outwardly from the periphery of the cam plate 38 are a pair of spaced teeth 44 and a tail section 38d that is formed between the teeth 44. Mounted directly beneath the cam plate 38 is a Y-shaped pawl 45 which, along with the cam plate 38, forms a type of an escapement mechanism. The substantially Y-shaped pawl 45 includes a pair of spaced arms 47 and 47a which are adapted to receive at predetermined times the tail section 38d and the teeth 44, as explained below. The Y-shaped pawl 45 includes a supporting leg 45a pivotally mounted substantially at the juncture of its arms on a shaft 46. An armature 48 is pivotally mounted on a pin 45b mounted on the free end of the supporting leg 45a to engage with an iron core 48b of the electromagnet 49a.

It is noted that the width of the gap between the leading edge of the switch-contacting surface 6 and the switch arm 8 of the switch S1 is less than the width of the gap between the leading edge of the switch-contacting surface 7 and the contact arm 9 of the switch S2. The width of the gap between the edge of the switch-contacting surface 7 and the contact arm 9 of the switch S2 is designed to allow the cam plate 38 to rotate a distance equal to one of the teeth 44, as will be explained more fully below. In addition, the width of the gap between the lever-actuating pin 10 and the pin-contacting arm 14a in the position of the pin and arm as shown in FIG. 1 is greater than the width of the gap between the leading edge of the switch-contacting surface 7 and the contact arm 9 of the switch S2.

Figure 2:
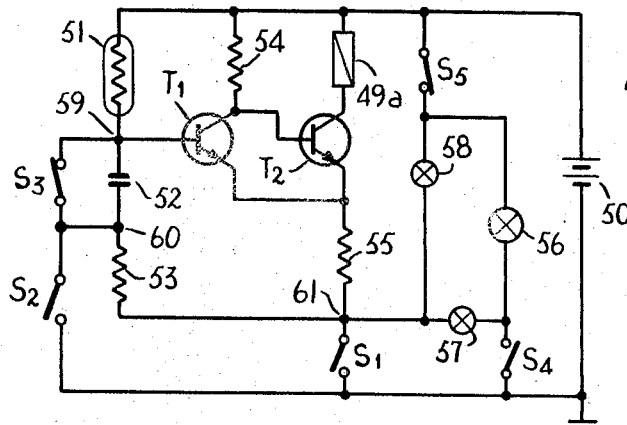

Referring now to the schematic circuit diagram shown in FIG. 2 a self-contained electrical energy source or battery 50 having a positive side connected through the switch S5 to a flash bulb 56 and a first pilot lamp 58 connected in parallel, the other side of the flash bulb 56 being connected to the normally open switch S4 and to one side of a second pilot lamp 57 the other side of which is connected to the other side of the first pilot lamp 58 and to a junction point 61. The other side of the switch S4 is connected to the negative side of the battery 50 which is also connected to one side of the switch S1 the other side of which is connected to the junction point 61. The negative side of the battery 50 is also connected to one side of the switch S2. In addition, the negative side of the battery 50 is grounded to the elongated trigger lever 1. The positive side of the battery 50 is also connected through a resistor 54 to the collector of a first transistor T1 and the base of a second transistor T2, and to the collector of the T2 transistor through the electromagnet 49a. The positive side of the battery 50 is further connected to one side of a photoconductive element 51 one side of which is connected to a junction point 59. The junction point 59 is connected to the base of the transistor T1 and also to one side of the capacitor 52 and the switch S3 which are connected in parallel, the other sides of the switch S3 and the capacitor 52 being connected to a junction point 60 which in turn is connected to the other side of the normally open switch S2 and one side of a brightness detection reference resistor 53 the other side of which is connected to the junction point 61. The junction point 61 is also connected to the emitters of the transistors T1 and T2 through a resistor 55.

Turning now to a description of the operation of the hereinabove described apparatus, when the trigger lever 1 is depressed by the operator and pushed downwardly against the bias exerted by the spring 4, the switch actuating surface 6 moves into engagement with the contact arm 8 of the switch S1, thereby closing that switch and actuating the light detection circuit which includes the photoconductive element 51, a switch 53, reference resistor 53 and the switch S1. In addition, the electromagnet-controlling circuit including the electromagnet 49a, the first transistor T1, the second transistor T2, the resistor 55 and the switch S1, and the light-indicator circuit including the flash switch S5, the light pilot lamp 58 and the switch S1, and the flash detector circuit including the flash switch S5, the flashbulb 56, (which includes an electronic flash unit or a throw-away flashbulb) the flash pilot lamp 57 and the switch S1, are all closed to indicate that the overall circuit and the apparatus described are in their operative position, the pilot lamp 58 will light up, in addition, the pilot lamp 57 will also light up if there is a flashbulb 56 connected in the circuit, thereby indicating to the operator that the flashbulb 56 is ready for firing.

When the light that is reflected from the subject to be photographed is below and adequate for the hereinafter called "EE photography," the voltage between the base and emitter of the transistor T1 which is regulated by the ratio of the resistance of the photoelectric element 51 to the resistance of the reference resistor 53, is such as to place the transistor T1 in its nonconducting state. With the transistor T1 in its nonconducting state, the voltage difference between the base and emitter of the transistor T2 increases and the transistor T2 begins to conduct, at which point the electromagnet 49a is energized due to the current flow initiated by the conductance of the transistor T2. With the electromagnet 49a energized, the Y-shaped pawl 45 is held in a fixed position so that the tooth 44 of the cam plate 38 is held by the inside surface of the arm 47a of the pawl 45. If the trigger lever 1 is now depressed further and the end 5 of the lever is brought into engagement with the locking lever 11, the locking lever 11 will pivot downwardly or in a counterclockwise direction about the shaft 12; however, the cam plate 38 is not free to move in a clockwise direction as a result thereof as would ordinarily be the case since the spring 40 biases the cam plate 38 in a clockwise direction, because the tooth 44 is engaged by the inside surface of the arm 47a.

As the operator moves the trigger lever 1 further downwardly, the switch-actuating surface 7 comes into engagement with the contact arm 9 of the switch S2 which is closed thereby to short out the reference resistor 53 which, when the switches S1 and S2 are closed, is placed in parallel with the switches. In this condition of the circuit, the pilot lamps 57 and 58 remain lit; however, under this set of conditions, the operator cannot take a photograph under natural light conditions, i.e., EE photography may not be effected. Further downward movement of the trigger lever 1 brings the lever-actuating pin 10 into contact with the pin-contacting arm 14a, thereby to pivot the elongated hook lever 14 in a clockwise direction which serves to free the locking arm 20 from engagement with the hook 17 of the lever 14. When arm 20 is released, the V-shaped lever 18 begins to rotate in a counterclockwise direction under the urging of the spring 23, thereby to rotate the ring 32 in a clockwise direction (FIG. 1) through the arm 21 of the lever 18 and the pin 34 mounted on the tab 34a of the ring 32. As the ring 32 rotates in a clockwise direction, the pin 36 rotates along with the ring and through its engagement with the sides of the slot 37a of the sector blade 37, the blade 37 is rotated radially of the exposure aperture, thereby initiating the exposure of the film strip (not shown) mounted within the camera. At this point, it is noted that the sector blade 37 is just one of a plurality of such blades which are normally used in a camera of this type, the rest of the sector blades not being shown herein so that the explanation of the operation of the apparatus will be simplified and thereby made clear to the reader. Simultaneously, the pin 35 moves away from the contacting arm of the timing switch S3 and the capacitor 52 begins to charge; however, as explained above, the operating conditions are such that there is not sufficient natural light for photographing the subject and due to the lack of light the current flowing through the photoconductive device 51 is so small that the charging speed of the capacitor 52 remains very low. As the pin 35 continues to move as the ring 32 is rotated in a clockwise direction, the pin 35 is brought into engagement with the contact arm for the synchronizing switch S4, thereby to close such switch. When the switch S4 is closed, the flashbulb 56 is thrown directly across the battery 50, thereby supplying sufficient current to actuate the flashbulb. As the flash discharge tube is actuated, it draws a very large amount of the available current, thereby dropping the voltage 50 very quickly which in turn leads to a weakening of the magnetic field for the electromagnet 49a which releases the iron core 48b so that the Y-shaped pawl 45 is free to pivot about the shaft 46. Consequently, the cam plate 38 may now rotate in a clockwise direction through the bias exerted by the spring 40 and because the lever 11 had previously been moved downwardly by the lever 1, thereby freeing the pin 41 from engagement with the lever 11. As the cam plate 38 rotates in a clockwise direction, the pin 42 is brought into engagement with the pin-contacting arm 30 of the substantially V-shaped hook lever 27, thereby to pivot said lever in a counterclockwise direction, freeing the finger 24 from engagement with the hook 31. With the finger 24 now released from engagement with the hook 31, the lever 22 rotates in a clockwise direction due to the urging of the spring 26, thereby to bring the finger 25 into engagement with the pin 34 and exert a pressure there against to rotate the ring 32 in a counterclockwise direction back to its starting point. As the ring 32 is moved back to its starting point, the pin 36 acts on the sector blade 37 to pivot the blade about the pin 37b and bring it back to its closed position, thereby shutting off the light passing through the exposure aperture and terminating the exposure of the film strip. As described above, the cam plate 38 does not begin to move before the beginning of the exposure action and the switch S5 remains closed until the synchronizing switch S4 closes. Under these conditions, the flash unit is operative and controls the exposure adjustment which is synchronized with the flash device. Under the set of conditions described above, the cam plate 38 will not move until the switch S4 is closed. However, the circuit and the mechanism are so arranged that the flash switch S5 remains in a closed position even if the cam plate 38 is moved slightly.

Turning now to a description of the operation of the apparatus and the circuits disclosed when there is sufficient natural light to make possible EE photography, when the trigger lever 1 is depressed and the switch S1 is closed, the light detection circuit, the light indicator circuit and the flash detector circuits are closed. The low resistance of the photoconductive device 51 causes the first transistor T1 to conduct, thereby to place the transistor T2 in its nonconducting state so that the electromagnet 49 is not energized and the Y-shaped pawl 45 is free to pivot about the shaft 46. As the end 5 of the lever 1 comes into contact with and moves the locking lever 11 downwardly and away from the pin 41 of the cam plate 38, the cam plate 38 is free to move in a clockwise direction (FIG. 1) and as soon as the cam plate 38 has traveled a distance equivalent to the width of the tooth 44 the switch S2 is closed, thereby shorting out the reference resistor 53 of the light detection circuit. When this occurs, the base voltage of the transistor T1 is reduced an amount sufficient to place the transistor T1 in its nonconducting state which, in turn, makes the transistor T2 conductive. As the transistor T2 begins to conduct, the electromagnet 49a is energized, thereby to momentarily halt the clockwise movement of the cam plate 38. Meanwhile, however, the cam plate 38 has rotated in a clockwise direction a distance sufficient to move the pin 43 out of engagement with the contact arm of the switch S5 to open that switch. With the switch S5 open, the pilot lamp 58 is deenergized, indicating to the operator that EE photograph is possible because there is sufficient natural light available, and, in addition, that the circuit for the flashbulb 56 is disconnected. Thus, under the conditions stated hereinabove, even if the switch S4 is closed, the flashbulb 56 will not be energized.

As the lever 1 is further depressed, the lever-actuating pin 10 engages the arm 14a to pivot the lever 14 in a clockwise direction, thereby to free the opening lever 18 which thereafter moves in a counterclockwise direction and in turn moves the pin 34 to rotate the ring 32 in a clockwise direction to begin the exposure action as described in the example above when the flash unit was utilized to supply the light necessary to illuminate the subject being photographed. As in the example above, the pin 35 moves away from the contact arm of the timing switch S3 thereby to open that switch so that the capacitor 52 will begin to be charged by the current passed by the photoelectric device 51. When the capacitor 51 has been charged to a predetermined voltage, the transistor T1 begins to conduct and the transistor T2 is placed into its nonconducting state which in turn leads to a deenergization of the electromagnet 49a. With the electromagnet 49a now deenergized, the Y-shaped pawl 45 is free to pivot about the shaft 46 and the cam plate 38 is free to move in a clockwise direction and bring the pin 42 into engagement with the pin-contacting arm 30 thereby to rotate the lever 27 in a counterclockwise direction. As the lever 27 is rotated in a counterclockwise direction, the hook 31 is moved from engagement with the finger 24 of the lever 22. The lever 22 is now free to rotate in a clockwise direction about the shaft 19 under the urging of the spring 26 to bring the finger 25 into engagement with the pin 34 and further to move the pin 34 to rotate the ring 32 in a counterclockwise direction. As the ring 32 moves in a counterclockwise direction back to its original position, the sector blade 37 is moved back to its closed position thereby completing the exposure of the film strip. When the cam plate 38 is in its fixed position, an automatic diaphragm adjusting device engages the ring 32, the flash mechanism is automatically actuated by closure of the synchronizing switch S4. If the diaphragm adjusting device is disengaged by the movement of the cam plate 38 before the initiation of the film exposure, EE photography may be utilized.

The present invention, therefore, provides a simplified means for switching between two methods of taking a photograph, by natural light or by artificial light and, in addition, there is provided means for maintaining a relatively uniform pressure on the trigger lever and, in addition, provides an even or steady operation of the elements comprising the shutter actuating mechanism and further provides means for effecting malfunction-free automatic flash photography.

What I claim and desire to secure by Letters Patent is:

1. A photographic shutter control apparatus for a camera comprising: release means actuatable through first and second working positions to initiate an exposure; driving means movable to effect exposure termination in response to actuation of said release means; electric circuit means including a photoelectric element, a reference resistor, a condenser, an electromagnet, an electromagnet controlling circuit operative to control the energization of said electromagnet and a flash apparatus controlling circuit for firing a flashbulb and operable in response to actuation of said release means to said first working position as a brightness detecting circuit to detect whether or not the brightness of the object to be photographed is adequate for daylight photography and operable in response to actuation of said release means to said second working position as a delay circuit to control the exposure period in response to the brightness of the object being photographed; and means coacting with said electromagnet when same is energized to immovably hold said driving means in one of at least two positions respectively corresponding to different predetermined time lags for effecting exposure termination in response to the brightness of the object being photographed when the brightness is above a predetermined level and for rendering inoperative said flash apparatus controlling circuit; whereby a suitable exposure period is automatically obtained in response to the brightness of the object to be photographed.

2. Apparatus as claimed in claim 1, wherein said electric circuit means includes brightness indicating means responsive to actuation of said release means for indicating when the brightness of the object to be photographed is not adequate for daylight photography.

3. Apparatus as claimed in claim 1, wherein said electric circuit means includes a flash pilot indicator connected to said flash apparatus controlling circuit in response to actuation of said release means for indicating when the brightness of the object is not adequate for daylight photography and that the flash apparatus controlling circuit is operative.

4. Apparatus as claimed in claim 1, including means operable when the detected brightness is below said predetermined level for enabling said electromagnet to hold said driving means in its initial position not withstanding actuation of said release means and to release said driving means in response to firing of said flashbulb.

5. Apparatus as claimed in claim 1, including means operable when the detected brightness is above said predetermined level for enabling said driving means to move a limited extend in response to actuation of said release means and thereafter be held by said electromagnet thereby rendering said flashbulb inoperative; whereby further movement of said release means initiates the exposure whereafter said electromagnet is deenergized to release said driving means to effect termination of the exposure.

6. Apparatus as claimed in claim 1, including an automatic aperture adjusting device cooperative with said driving means for effecting automatic flash photography; and means for rendering said automatic aperture adjusting device inoperative during daylight photography.

7. Apparatus as claimed in claim 1, wherein said driving means includes a toothed cam, and a forked lever cooperative with said toothed cam in response to energization of said electromagnet to effect exposure termination.

8. A photographic shutter control apparatus for controlling the exposure time of a camera comprising: trigger means movable in a given direction to an actuating position for initiating an exposure; movably mounted driving means movable in one direction to effect exposure termination; an electromagnet operative when energized to prevent movement of said driving means and effective when deenergized to allow movement of said driving means; flash circuit means including a flashbulb operative when actuated to fire said flashbulb; and electric circuit means including said electromagnet operable in a first mode in response to movement of said trigger means towards said actuating position for detecting the brightness of the object is below a preselected level and operable in a second mode in response to further movement of said trigger means towards said actuating position to alternatively effect a. energization and deenergization of said electromagnet as a function of the brightness of the object being photographed when said brightness is above said preselected level and b. actuation of said flash circuit means and deenergization of said electromagnet in response to firing of said flashbulb when said brightness is below said preselected level.

9. An apparatus according to claim 8; including indicating means operative in response to movement of said driving means for indicating if the brightness is below said preselected level.

10. An apparatus according to claim 8; wherein said driving means comprises a movably mounted cam movable in one direction to effect exposure termination, and means for controlling the movement of said cam in response to both movement of said trigger means and energization of said electromagnet.

11. An apparatus according to claim 10; wherein said last-mentioned means includes means locating said trigger means relative to said electromagnet whereby said electromagnet is effective when energized to prevent movement of said cam regardless of movement of said trigger means.